March 28, 1961 C. J. DAUBENBERGER 2,976,575
METHOD FOR MOLDING O-RINGS AND THE LIKE
Filed Jan. 28, 1957 2 Sheets-Sheet 1

INVENTOR.
CHARLES J. DAUBENBERGER
BY
ATTORNEY

March 28, 1961  C. J. DAUBENBERGER  2,976,575
METHOD FOR MOLDING O-RINGS AND THE LIKE
Filed Jan. 28, 1957  2 Sheets-Sheet 2

INVENTOR.
CHARLES J. DAUBENBERGER
BY
ATTORNEY

United States Patent Office 2,976,575
Patented Mar. 28, 1961

2,976,575

METHOD FOR MOLDING O-RINGS AND THE LIKE

Charles J. Daubenberger, Pacific Palisades, Calif., assignor to Plastic and Rubber Products Company, Los Angeles, Calif., a corporation of California Filed Jan. 28, 1957, Ser. No. 636,773

9 Claims. (Cl. 18—55)

This invention relates to the molding and curing of rubber and rubber-like materials, and particularly to a new and improved molding process which utilizes internal expansion of the material being molded, and apparatus for carrying out that process.

Conventional processes for molding rubber and the like involve the use of dies having a mold cavity in which is placed a volume of material to be molded which is somewhat greater than that of the cavity. When the dies are closed with a substantial force, the material is compressed and formed in accordance with the configuration of the cavity. The dies are formed with flash recesses into which excess material flows and are maintained at a predetermined temperature and in closed position for a predetermined time to assure proper curing of the material.

As is well known, curing or vulcanizing of material such as rubber involves the mixing of sulphur with raw rubber and heating the compound. During this heating, the sulphur combines chemically with the rubber hydrocarbon and changes its physical properties so that the cured rubber is not affected by ordinary temperature changes, is immune to solvents, and has superior strength and abrasion resistance. Vulcanization is a progressive reaction, and must be carried on for a definite period of time at a given temperature to accomplish proper curing of the rubber. That is, curing involves, in effect, the addition of a precise quantity of heat to the material. It will be apparent, therefore, that the curing time and curing temperature are interrelated, so that curing time may be shortened by elevating the curing temperature.

The primary deficiency of conventional compression molding processes for rubber and the like is the prolonged curing time necessary to assure proper curing of the molded article. Thus, for example, as presently practiced, compression molding of rubber O-rings requires a curing time of approximately twenty minutes. It will be evident that this prolonged curing time greatly limits the number of articles which may be molded in a given period of time.

One of the reasons for the relatively long curing time necessary in compression molding of rubber is that the latter, during curing, is in a highly compressed state. This compression of the rubber appreciably lowers its normally low coefficient of heat absorption, with the result that the rate at which the rubber absorbs and retains heat is reduced and the curing time is increased. Attempts to shorten the curing time by elevating the curing temperature have, in the past, proved unsuccessful because of the fact that such elevated curing temperatures have resulted in charring and blistering of the surface of the molded article.

This charring and blistering results from the entrapment of air and other gases in the mold cavity, due to the magnitude of the force with which the dies are retained in contact during the curing period, and to the fact that air and other gases in the pores of the rubber material itself are dispersed substantially uniformly throughout the material, and, therefore, exist adjacent the surface of the latter. At the higher curing temperatures the oxygen in these entrapped gases in the mold cavity caused carbonization of the surface of the material in contact with the heated surfaces of the dies.

In view of what has been said, it will be evident that a substantial reduction in the curing time may be effected if the material being molded is in an expanded or expanding state rather than a compressed state during curing. This is so, of course, because of the fact that the material possesses a higher coefficient of heat absorption and retention. Also, if the gases are removed from the mold cavity as well as from the material being molded, adjacent to the surface of the latter, the curing temperature may be elevated, to further reduce the curing time, without charring or blistering of the material.

A primary object of this invention is the provision of a new and improved process for molding rubber and like material.

Another object of the invention is the provision of a process for molding rubber and like material which yields a substantial reduction in the curing time.

Yet another object of the invention is the provision of a process for molding rubber and like material which may be carried on at substantially increased curing temperatures without charring or blistering of the molded article.

Still another object of the invention is the provision of a process for molding rubber and like material which involves internal expansion of the material being molded so that the latter is in an expanding state during curing with a resultant substantial increase in the rate at which the material absorbs and retains the curing heat, and, accordingly, a substantial reduction in the curing time.

A further object of the invention is the provision of a process for molding rubber and like material which results in a molded article having a more homogeneous cross-section, increased density and improved qualities in general.

A still further object is the provision of a process for molding rubber and like material which involves metering into a mold cavity a volume of material to be molded which is less than the volume of the cavity.

Briefly, the process of this invention involves the placing in a mold cavity, of desired shape, a volume of material to be molded which is less by a predetermined amount than the volume of the cavity. In this connection, the invention provides a pair of cooperating dies which are so configured as to automatically shear this correct volume of material into the mold cavity from a sheet or billet of material when the dies are closed, as described below. The dies, which are heated to a predetermined temperature substantially higher than that at which the dies are run in conventional compression molding processes, are initially closed and opened a number of times in rapid succession to progressively shear and mechanically work the material. This alternate opening and closing of the dies for mechanically working the material is hereinafter referred to as "bumping." The "bumping" operation is carried on in such a manner that initial closure of the dies is not complete, and during each successive closure, the gap between the dies is progressively reduced so as to enable working or kneading of the material. After a given number of closures, the dies are completely closed and retained in the closed position until final curing of the molded article is completed. Alternatively, the shearing of the material may be effected by a first full closing stroke of the dies, after which the dies may be reciprocated to provide the bumping action. In this latter method, the progressive closing of the dies during the bumping action is not necessary, but the dies can be operated through any desired range, the important feature being the successive kneading or bumping of the material, accompanied by external heating, to internally heat the material until the center thereof is in a semi-fluid state, while simultaneously molding the material to the desired shape. The use of the present molding process in the molding of rubber O-rings has resulted in a reduction of the curing time from approximately 20 minutes to approximately 20 seconds.

This reduction in the curing time in the present process is due to the elevated temperatures at which the dies are run and to the fact that the material being molded is, as described below, in an expanding state during curing. The material thereby possesses a higher coefficient of heat absorption and retention so as to be capable of more rapidly absorbing and retaining the necessary amount of heat to effect proper curing. The phenomena which occurs to accomplish the above ends is as follows. During the bumping step of the process, the material is alternately compressed and permitted to expand in rapid succession and is thereby heated, due to friction between the molecules of the material, in the same manner, for example, that a piece of metal becomes heated when rapidly flexed in opposite directions a number of times. During this step, a portion of the mechanical energy moving the dies is converted into thermal energy in the material.

Maximum heating of the material occurs at its center. Thus, it has been found in the molding of rubber O-rings by this process that during the bumping step, the centers of the O-rings are heated to a more fluid state than the surface. Internal heating of the material by this mechanical working thereof and external heating of the material by the dies, which are maintained at a relatively high temperature, has a two-fold effect. First, a high degree of expansion of the material occurs, resulting in the displacement of a substantial portion of the gases from the die cavity through the space between the dies which, during this stage, are not completely closed. Secondly, the gases in the material migrate to the center of the latter. In conventional molding processes, the dies are initially completely closed with substantial force. Accordingly, entrapped gases are not permitted to escape. In the process of this invention, as just mentioned, the dies are not initially completely closed so that gases may be displaced from the cavity.

Migration of the gases toward the center of the material being molded is due to compression of the material during the bumping process and to the semi-fluid state of the center of the material. This fluidity at the center gives rise to a lesser resistance to inward migration of the gases than to outward migration of the latter to the outer periphery of the material, which, at this time, is in a relatively solid state. The invention provides a predetermined period of mechanical working of the material sufficient to assure substantially complete inward migration of the gases to the center of the material.

After final closure of the dies, the gases which have migrated to the center of the material and the material itself undergo further expansion as a result of heat transfer to the material from the heated dies. Initial expansion of the material occurs in an outward direction against the inner surfaces of the mold cavity so that the latter is completely filled by the material. During this phase of the process, the force retaining the dies in closed position is limited to allow additional escape of the gases from the cavity. Final expansion of the material occurs inwardly to close the center void in the material, with resultant dispersing of the trapped gases throughout the central portion of the material.

Final curing of the material takes place during this expansion process with a resultant substantial increase in the rate at which the material absorbs and retains the curing heat. Since most of the gases are displaced from the mold cavity and to the central portion of the material, and owing to the higher rate of heat absorption of the material, final curing may be carried on at substantially elevated temperatures without charring and blistering of the surface of the molded article.

A better understanding of the invention may be had from the following detailed description thereof taken in conjunction with the accompanying drawings, wherein.

In the ensuing description, the term "billet" describes an initial form of the material being worked, and the term "blank" describes the form of the material after the bumping and other operations prior to final curing in a mold having a larger cavity. The billet may have a different shape and volume than the blank, or the billet may have the same shape but a larger volume than the blank, requiring a shearing or similar operation to remove excess material, or the billet may have both the same shape and volume as the blank.

Figure 1:
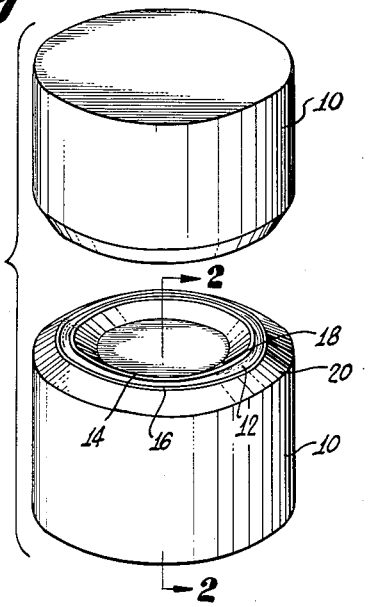
Figure 1 is a perspective view illustrating dies of novel configuration which may be employed in the practice of the present process to produce rubber O-rings.
Figure 2:
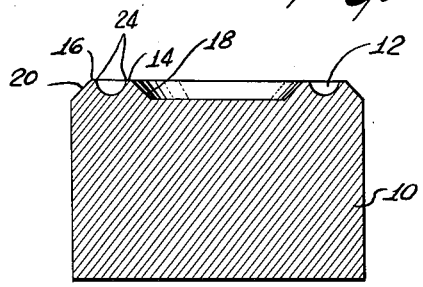
Figure 2 is an enlarged section taken along lines 2—2 of Figure 1.

Referring first to Figures 1 and 2 of the drawings, there are illustrated a pair of identical dies 10 which are uniquely adapted to the practice of the present process and which are shown to have a cavity configuration suitable for the molding of rubber O-rings. In this connection, it is deemed advantageous to point out at this time that the drawings and ensuing description illustratively disclose the present process as it relates to the molding of rubber O-rings. It will become apparent as the description proceeds, however, that the process is not limited in its application to the molding of such specific articles but rather has general application to the molding of articles of any configuration. Accordingly, while, for facility of description, the invention will be disclosed with reference to the molding of rubber O-rings, the invention should not be though of as limited to this application.

The dies 10 in Figures 1 and 2, which accomplish automatic metering into the mold cavity of the dies a volume of material to be molded which is less than the volume of the cavity, are cylindrical in cross-section and constructed of suitable metal, such as die steel. In practice, the dies 10 are coaxially supported on structure, not shown, for relative movement toward and away from one another.

The opposing ends of the dies are identically configured to provide on each die an annular cavity 12 of semi-circular cross-section, annular end faces 14 and 16 at opposite sides of the cavity, located in a common plane normal to the axis of the die, and inner and outer conical surfaces 18 and 20 inclined at approximately 45° to the axis of the dies. When the dies are closed during a molding cycle, end faces 14 and 16 abut and the cavities 12 are aligned to define an annular mold cavity of circular cross-section conforming to the shape of an O-ring.

Figure 3:
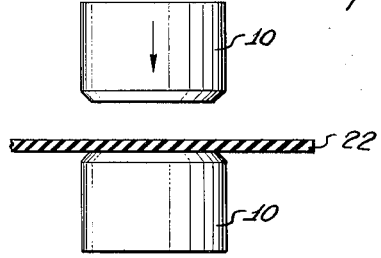
Figure 3 illustrates the initial step in the present process.

As preliminarily discussed, the dies, above described, accomplish metering of a precise amount of material to be molded into the mold cavities 12, as will now be described with reference to Figures 3–6. As shown in Figure 3, a flat billet 22 of raw rubber, for example, suitably impregnated with a proper amount of sulphur, is placed between the dies 10. During initial closure of the dies, the relatively sharp circular edges 24, defining the intersections of the walls of the mold cavities 12 with the annular end faces 14 and 16, function as cutting edges which shear the billet 22. Due to normal compressional distortion of the billet 22 during this shearing by the cutting edges 24, the sheared edges of the O-ring blank in the cavities will not be flat but rather will be concaved to a degree. Accordingly, the volume of the material or blank B which remains in the cavities after complete closure of the dies will be slightly less than the total volume of the cavities. It has been found that the difference between these volumes is not sufficient to efficient practice of the present process, and the volume of the blank remaining in the mold cavities cannot be so precisely controlled by the shearing action alone as to achieve the desired uniformity of the molded articles.

Precise metering of a predetermined lesser amount of material of the flat billet 22 into the die cavities is accomplished by virtue of the compression vector forces 25 exerted on the material by the conical surfaces 18 and 20 of the dies when the latter are moved to closed position. The resultants 26 of these forces are directed radially inwardly and outwardly away from the die cavities in planes normal to the axis of the dies. These resultant forces 26 tend to draw an additional amount of the material of the flat billet 22 from the interior of the die cavities and from between the annular end faces 14 and 16 on the two dies as the material is sheared by the edges 24. It has been found that by exercising proper control over the closing speed of the dies, the amount of the material which is withdrawn from the interior of the die cavities may be precisely controlled so that upon complete closure of the dies, a blank remains in the die cavity which has a volume that is less by a precise amount than the volume of the cavity and all but a thin membrane of the material of the flat billet 22 is withdrawn from between the end faces 14 and 16. For example, in the molding of rubber O-rings, it has been found that with 70 Shore sheet or billet rubber stock and a die closing speed of 14 feet per minute, the volume of the blank B remaining in the die cavity is eight-tenths of the volume of the latter. This value is ideal for successful practice of the present process. The force applied to the dies during this shearing operation, in the case of O-rings, is less than the force which is finally applied to the dies to keep them closed and is on the order of 100 pounds per square inch for the above stock.

The exact volume of the material which remains in the cavity is dependent upon both the hardness of the material and the die closing speed. Thus, as the hardness of the material is increased, the die closing speed must be decreased to accomplish metering of the same volume of material into the cavity. Similarly, the volume of material in the cavity may be accurately increased or decreased by decreasing or increasing, respectively, the die closing speed.

The above described metering step, in effect, comprises an initial step of the present process to be now described. As preliminarily indicated, this metering step is not usually accomplished in a single closure of the dies, as in conventional shearing operations. Rather, the dies are opened and partially closed several times in rapid succession at a controlled rate to mechanically work the material 22 simultaneously with shearing thereof, as will now be described.

Figure 4:
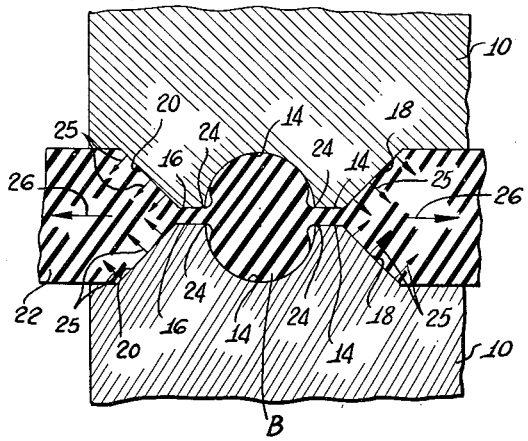
Figures 4, 5 and 6 are enlarged sections taken through a portion of the present dies and illustrating the mechanical working of bumping of the mold material.
Figure 5:
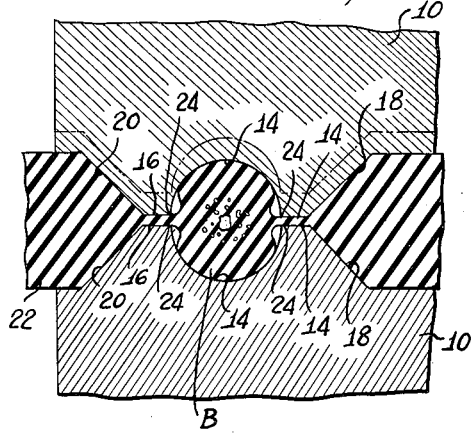
Figure 6:
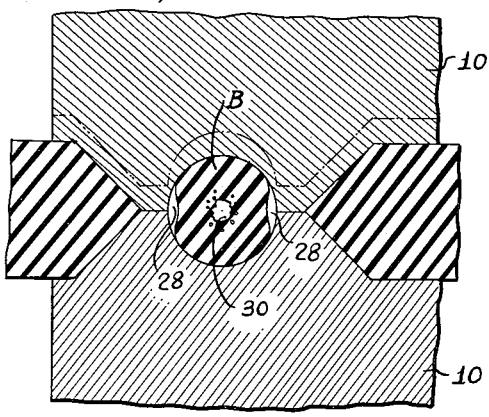

As shown in Figures 4–6, the dies are not completely closed during their initial closure and are closed to a progressively reduced separation on each successive closure so that the material, in effect, is sheared in steps. On the third closure of the dies (Figure 6), for example, the latter are completely closed and the blank B within the die cavities is severed from the flat billet 22 except for an extremely thin connecting membrane (not shown), of the material which remains between the annular end faces 14 and 16 of the dies.

During the initial partial closure of the dies of the position of Figure 4, the flat billet 22 is partially sheared by the cutting edges 24 and the edges of the ring shaped blank B of material which is thereby partially formed in the die cavities are compressed. As a consequence of this peripheral compression of the partially formed blank, the material thereof is deformed from its flat condition to the somewhat laterally indented condition shown in that figure. During the following momentary opening of the dies to the phantom line position of Figure 5, the partially formed blank tends to return (expand) to its normal unstressed condition. During the subsequent partial closure of the dies to a slightly greater degree, as shown in solid lines in Figure 5, the partially formed blank is further sheared by the cutting edges 24 and is further laterally indented. Again during the following opening of the dies to the phantom line position of Figure 6, the material tends to return to its normal condition until, upon final closure of the dies to their completely closed position, the material is substantially completely sheared by the cutting edges 24 and is laterally indented to the condition of Figure 6, forming the blank B.

Owing to the previously discussed action of the conical surfaces 14 and 16 and the controlled rate of die closure during the shearing and kneading step just described, there remains in the mold cavity a blank B having a volume which is less than the volume of the cavity by a predetermined amount. This blank configuration in cross-section, resulting in gas-filled voids 28 on opposite sides of the blank. The dies 10 are heated to relatively high temperatures throughout the process, including the just described bumping operation. Preferably, the temperatures of the dies are slightly different for reasons to be presently discussed. It has been found, for example, in the molding of rubber O-rings that the upper die 10 can be heated to a temperature as high as 385 degrees without causing scorching or blistering of the material. The lower die is, in such cases, preferably heated to a temperature in the range of 380 degrees.

The material or blank in the die cavity is externally heated, owing to these elevated temperatures of the dies. The alternate compression and expansion of the billet or partially formed blank during the bumping process just discussed results in internal heating of the material due to friction of the molecules when the material is flexed during the bumping process. It has been found that by bumping the material a given number of times, its interior can be heated to a semi-fluid state. Thus, in the production of O-rings, from two to six bumps, depending on the hardness of the material used, have been found to be sufficient to place the center of the O-ring blank in a semi-fluid state, the temperature of the material decreasing toward the surface of the blank at this stage of the process. The material adjacent the surface of the blank is, therefore, in a more dense, solidified state than the material at the center of the blank.

Compression of the material of the billet or partially formed blank during working or bumping thereof causes compression of the pores therein resulting in migration of the air and other gases trapped in such pores through the material. Because of the increasing fluidity of the material toward the center thereof, less resistance is offered to the inward migration of the gases toward the center than is offered to the outward migration of the gases through the more dense and solidified portions of the material adjacent the surface of the latter. Accordingly, the gases trapped in the material tend to migrate toward and accumulate at the center of the latter to form a central void 30. The present process has been very successfully practiced in the manufacture of rubber O-rings, as well as other mechanical rubber goods. O-ring blanks have been removed from the dies immediately following the bumping process and have been sectioned, the central void 30 being clearly visible in the section and on the order of ⅛ inch in diameter.

Figure 7:
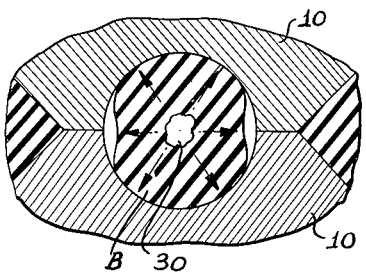
Figure 7 is a further enlarged section similar to Figures 4, 5 and 6 illustrating the initial outward expansion of the material being molded.
Figure 8:
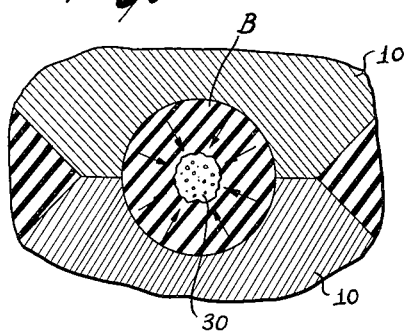
Figure 8 is a view similar to Figure 7 illustrating the subsequent inward expansion of the material being molded.

Owing to heating of the material 22, both as a result of mechanical working thereof and the elevated temperatures of the dies 10, it expands as does the gas which is trapped in the central void 30. After final closure of the dies, this expansion of the material and the centrally trapped gases results first in outward expansion (Figure 7) of the blank against the walls of the die cavity to close the voids 28 (Figure 8). This outward expansion of the blank is, obviously, impeded to the extent that the gases in the voids 28, displaced by the expanding blank, are prevented from escaping from the mold cavity between the opposing annular faces 14 and 16 of the dies. As previously indicated, these gases, if not removed from the die cavities, cause scorching and blistering of the surface of the blank in contact with the heated dies. In order to accommodate escape of these gases, therefore, the force applied to the dies, to retain them in their closed position, is maintained at a value just sufficient to prevent separation of the dies under the force of the expanding blank in the mold cavity. This applied force in the molding of O-rings is on the order of 400 pounds per square inch. A thin membrane of material remains between the opposing die faces 14 and 16 which would seem to form a gas-tight seal. It has been found, however, that this membrane is exceedingly thin and quickly charred by the heated dies with the resultant formation of minute passages which permit the escape of the gases from the mold cavity.

Figure 9:
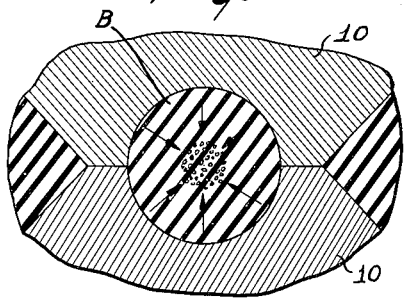
Figure 9 is an enlarged cross-section of the material at the completion of the molding and curing process.

The blank continues to expand outwardly in this fashion until the voids 28 are completely closed (Figure 8) and the blank entirely fills and conforms exactly with the configuration of the mold cavity. Further outward expansion of the material is thereby prevented. At this stage in the process, the central void 30 will be enlarged slightly relative to its initial size, as shown in Figure 6, owing to the expansion of the gases trapped therein. After outward expansion is terminated, expansion of the blank takes place in an inward direction with resultant closing of the central void, as shown in Figure 9. This closure of the central void results in outward migration of the gases which are trapped therein toward the surface of the blank. As discussed below, however, curing or vulcanization of the material will have been substantially completed by this time, and outward migration of the trapped gases to the surface of the now-molded article is prevented. It has been found that these trapped gases, therefore, become uniformly dispersed throughout about the one-third central portion of the material, as illustrated in Figure 9.

The process to this stage has consumed, in the molding of rubber O-rings, for example, approximately 18 seconds, and, as just indicated, curing of the material is already substantially completed. This rapid curing of the material is accomplished by virtue of the elevated temperatures to which the dies are heated and by virtue of the expanding state of the material in the blank during the curing period, as discussed below.

As previously discussed, attempts to cure at elevated die temperatures in conventional compression molding processes results in charring and blistering of the material. Thus, in compression molding processes, as heretofore practiced, the dies are retained in contact during their first closure with substantial force on the order of 350 tons, for example, in the production of O-rings. This magnitude of force on the dies precludes the escape of gases from the mold cavity. The oxygen in these trapped gases promotes charring and blistering of the surface of the material in contact with the heated die surfaces. In the present process, however, most of the gases are displaced from the mold cavity during the bumping step, and the remaining gases are permitted to be displaced from the die cavity during outward expansion of the blank following final closure of the dies by virtue of the reduced forces employed in retaining the dies in closed condition. Substantially all of the gases are thereby removed from between the surfaces of the die cavities and the blank. Accordingly, little, if any, oxygen is present to cause charring of the blank.

Blistering of the material in the conventional compression molding processes also results from the fact that the gases entrapped within the blank are substantially uniformly dispersed throughout the entire cross-section of the latter. Accordingly, some of these entrapped gases lie adjacent the surface of the blank. These surface gases expand and cause rupturing of the material at the surface of the blank, with resultant blistering of the surface. In the present process, on the other hand, the gases are initially driven away from the surface of the material and toward the center so that no blistering takes place even at the elevated die temperatures employed.

The progressive closing or shearing of the billet is not essential, that is, the billet could be sheared on the first closure of the dies and then worked by several subsequent complete or partial closures of the dies, or the shearing may be performed as an independent step prior to bumping. The reason for the progressive closure in the illustrated process is that the small surface area contact between the illustrated dies limits the closing force which may be used without damage to the dies. As a result, the first movement of the dies together is stopped at a given die spacing because the resistance of the rubber becomes equal to the closing force. During the next closure, the dies close a bit further before the resistance equals the closing force, and so on until the dies are completely closed. If the closing force is sufficient, however, the dies can close completely each time.

In compression molding processes, the material in the mold cavity is under substantial pressure or compression, owing to the fact that the cavity is initially filled with a relative cool volume of material which, after heating, is somewhat greater than the volume of the cavity. The compressed state of the material, together with its high heat insulating properties, as well as the relatively low temperatures at which the dies are run, results in a substantial curing time necessary to impart the required amount of heat to the material for proper curing. Thus, in the molding of rubber O-rings by conventional compression molding processes, a curing time of approximately 20 minutes is required.

In the present process, on the other hand, the material being molded is in an expanding state, being first allowed to expand outwardly and then inwardly. Rubber, for example, when in such an expanding state, absorbs and retains heat at a rate which is appreciably higher than the rate at which it absorbs and retains heat when compressed. This higher rate of heat absorption and retention of the material in the present process, and the elevated die temperature effect a substantial reduction of the curing time. Thus, as preliminarily indicated in the molding of rubber O-rings, it has been found that curing time can be reduced to approximately 20 seconds. This relatively brief curing time also helps to avoid charring and blistering since curing is completed before carbonization of the material can occur.

The dies 10 are maintained at differential temperatures, for example, at the previously mentioned values of 380 and 385 degrees, to provide for a more rapid heat transfer to the material owing to the natural tendency of the heat to flow from the hotter die to the colder die. Thus, this temperature differential establishes a dynamic heat transfer situation across the blank in the mold cavity which results in more rapid transfer of heat to the blank. The present process results in a superior molded article, owing to the dispersion of the gases entrapped in the article in the central portion thereof so that in the case of an O-ring, for example, the surface portion of the ring which is in contact with the surfaces of the apparatus in which the ring is employed, has greater density and is less porous so that the ring has superior sealing qualities, resistance to abrasion, and is less prone to deterioration in general.

It will be apparent from the foregoing description that there has been disclosed a process and die configuration which are fully capable of obtaining the objects and advantages preliminarily set forth. It will also be apparent that various deviations in the practice of the process and in the type of article formed by the process, as well as various modifications in die configurations, may be made without departing from the spirit and scope of the following claims.

I claim:
1. A process for molding and curing a curable rubber material, comprising the steps of: (1) providing a blank of said rubber material in its uncured state; (2) alternately compressing the material of said blank and allowing it to expand in rapid succession to cause internal frictional heating of the blank and simultaneously heating the blank externally whereby to place the center of the blank in a semi-fluid state and drive entrapped gases in the material inwardly away from the surface to the center of the blank whereby a gas-filled void is formed at the center of the blank; and (3) confining said internally heated blank in a mold cavity having a volume greater than that of the blank and applying external heat to the blank while the latter is so confined to cause expansion of the gases at the center of the blank and outward expansion of the material of the blank to fill the cavity, subsequent inward expansion of the material of the blank to close said void and disperse the entrapped gases in the void throughout the center portion of the blank, and curing of the material while the latter is undergoing said outward and inward expansion.

2. A process for molding and curing a curable rubber material by means of a pair of dies relatively movable along given direction lines to place opposing faces thereof in contact, which faces are recessed to form a mold cavity when the dies are in contact, said process comprising the steps of: (1) heating said dies; (2) providing between said dies a billet of said rubber material in its uncured state having a volume which is greater than the volume of the cavity; (3) shearing a blank having a volume less than the volume of said dies from said billet, while alternately compressing the material of the billet and allowing it to expand by reciprocating the heated dies in rapid succession to cause internal frictional heating of the billet whereby to place the center of the billet in a semi-fluid state and cause inward migration of the entrapped gases in the material away from the surface of the billet to the center thereof whereby a gas-filled void is formed at the center of the billet; and (4) completely closing the heated dies to confine the internally heated blank in the cavity and retaining the dies in closed condition to cause initial expansion of the gases at the center of the blank and outward expansion of the material of the blank to fill the cavity, subsequent inward expansion of the material of the blank to close said void and disperse the gases in the void throughout the center portion of the blank, and curing of the material while the latter is undergoing said outward and inward expansion.

3. The process according to claim 2 wherein in the third step initial closure of the dies to initially compress the blank is terminated before the dies are completely closed and the dies are closed to a progressively smaller spacing during each successive closure thereof.

4. The process according to claim 2 wherein said dies are heated to different temperatures whereby to accelerate heat transfer from the dies to the material of the blank.

5. A process for molding and curing a curable rubber material comprising the steps of: (1) forming a blank from a billet of said rubber material in its uncured state and simultaneously alternately compressing the billet and allowing it to expand in rapid succession to cause internal frictional heating of the billet and heating the billet externally whereby to place the center of the billet in a semi-fluid state and cause inward migration of gases in the material of the billet away from the surface to the center of the billet whereby a gas-filled void is formed at the center of the billet; and (2) confining the internally heated blank in a mold cavity of desired configuration having a volume greater than that of the blank and externally heating the confined blank to cause outward expansion of the material of the blank to fill the cavity, inward expansion of the material of the blank to close said void and disperse the gases in the void throughout the center portion of the blank, and curing of the material while the latter is undergoing said outward and inward expansion.

6. A process for molding and curing a curable rubber material comprising the steps of: (1) providing a pair of heated cooperating dies relatively movable along given direction lines to place opposing faces thereof in contact, which faces are recessed to form a mold cavity of desired configuration and wherein the intersections of the cavity walls and said faces form shearing edges, portions of the faces beyond said shearing edges being recessed; (2) placing a relatively flat billet of said rubber material, having a volume greater than the volume of the dies, in its uncured state between the dies; (3) alternately moving the heated dies together and apart at a controlled rate with the dies closing to a slightly smaller spacing during each successive closure for shearing said billet to form in said cavity a blank of said material while alternately compressing the material of the billet and allowing the same to expand in rapid succession to cause internal frictional heating of the material of the billet to place the center thereof in a semi-fluid state and drive gases entrapped in the material away from the surface to the center of the billet whereby a gas-filled void is formed at the center of the billet, and simultaneously applying forces to the billet in the plane thereof and directed away from the cavity to draw material from the cavity during shearing of the material whereby the volume of material remaining in the cavity and comprising said blank is less than the volume of the cavity; and (4) finally completely closing the heated dies and retaining the latter in closed position to cause initial expansion of the gases at the center of the material of the blank and outward expansion of the material of the blank to fill the cavity, subsequent inward expansion of the material of the blank into a substantially homogeneous cross-section, and curing of the material while the latter is undergoing said outward and inward expansion.

7. The process of making rubber O-rings which comprises the steps of: (1) providing an annular O-ring billet of uncured curable rubber material; (2) forming a blank from the billet by alternately compressing the billet and allowing it to expand in rapid sequence to cause internal frictional heating of the billet and simultaneously externally heating the billet to place the center of the billet in a semi-fluid state and drive entrapped gases therein inwardly away from the surface to the center of the billet whereby a gas-filled void is formed at the center of the billet; and (3) confining the internally heated blank in an annular O-ring mold cavity having a volume greater than that of said blank and applying external heat to the blank while the latter is so confined to cause initial expansion of the gases at the center of the blank and outward expansion of the material of the blank to fill the cavity, subsequent inward expansion of the material of the blank to close said void and disperse the entrapped gases in the void throughout the center portion of the blank, and curing of the material while the latter is undergoing said outward and inward expansion.

8. The process of making rubber O-rings by means of a pair of dies relatively movable along given direction lines to place opposing faces thereof in contact, which faces are recessed to form an annular O-ring mold cavity when the dies are in contact, which comprises the steps of: (1) heating said dies; (2) providing an annular O-ring billet of uncured, curable rubber material having a volume greater than the volume of said cavity; (3) forming a blank from the billet by alternately compressing the billet and allowing it to expand by opening and closing of the heated dies in rapid succession to cause internal frictional heating of the billet whereby to place the center thereof in a semi-fluid state and cause inward migration of entrapped gases in the billet away from the surface of the latter to the center thereof whereby a gas-filled void is formed at the center of the billet; and (4) completely closing the dies to confine the internally heated blank in the cavity and retaining the dies in closed condition to externally heat the blank and cause expansion of the gases at the center of the blank and outward expansion of the material of the blank to fill the cavity, subsequent inward expansion of the material of the blank to close said void and disperse the gases in the void throughout the center portion of the blank, and curing of the material while the latter is undergoing said outward and inward expansion.

9. The process of making rubber O-rings, which comprises the steps of: (1) providing a pair of heated cooperating dies having opposing faces thereof formed with raised, annular, concentric lands each defined by radially inner and outer conical side walls which converge toward the opposite die and a pair of flat annular, concentric end faces which are radially spaced by an annular recess of semi-circular cross-section, the intersections of said end faces and wall of the respective recess forming annular shearing edges, said dies being movable toward one another to a position wherein said end faces are in contact and said recesses define an annular O-ring mold cavity; (2) placing a relatively flat billet of uncured, curable rubber material between said heated dies; (3) alternately moving said heated dies together and apart in rapid succession with the dies closing to a slightly smaller spacing during each successive closure for progressively shearing said billet with said shearing edges and exerting a tension on said billet by said inclined side walls tending to draw the material of the billet out of said recesses whereby to form in said cavity an annular O-ring blank of said material having a volume less than the volume of said cavity, and simultaneously alternately compressing the billet and allowing it to expand in rapid succession to cause internal frictional heating of the billet whereby to place the center thereof in a semi-fluid state and drive gases entrapped in the billet to the center of the latter whereby a gas-filled void is formed at the center of the billet; and (4) finally completely closing the dies and retaining the latter in closed position to cause initial expansion of the gases at the center of the blank and outward expansion of the material of the blank to fill the cavity, subsequent inward expansion of the material of the blank into a substantially homogeneous cross-section and curing of the material while the latter is undergoing said outward and inward expansion.

References Cited in the file of this patent

UNITED STATES PATENTS

| | | | |
|---|---|---|---|
| 1,978,985 | Cobb | | Oct. 30, 1934 |
| 1,989,724 | Villanyi | | Feb. 5, 1935 |
| 2,027,165 | Grubman | | Jan. 7, 1936 |
| 2,148,079 | Martin | | Feb. 21, 1939 |
| 2,569,226 | Carter | | Sept. 25, 1951 |
| 2,607,080 | Stewart | | Aug. 19, 1952 |
| 2,615,203 | Du Pree | | Oct. 28, 1952 |
| 2,646,595 | Leistensnider | | July 28, 1953 |
| 2,671,933 | Nye | | Mar. 16, 1954 |